Nov. 20, 1923
P. DUNKEL
RESILIENT VEHICLE WHEEL
Filed July 25, 1922
1,474,465
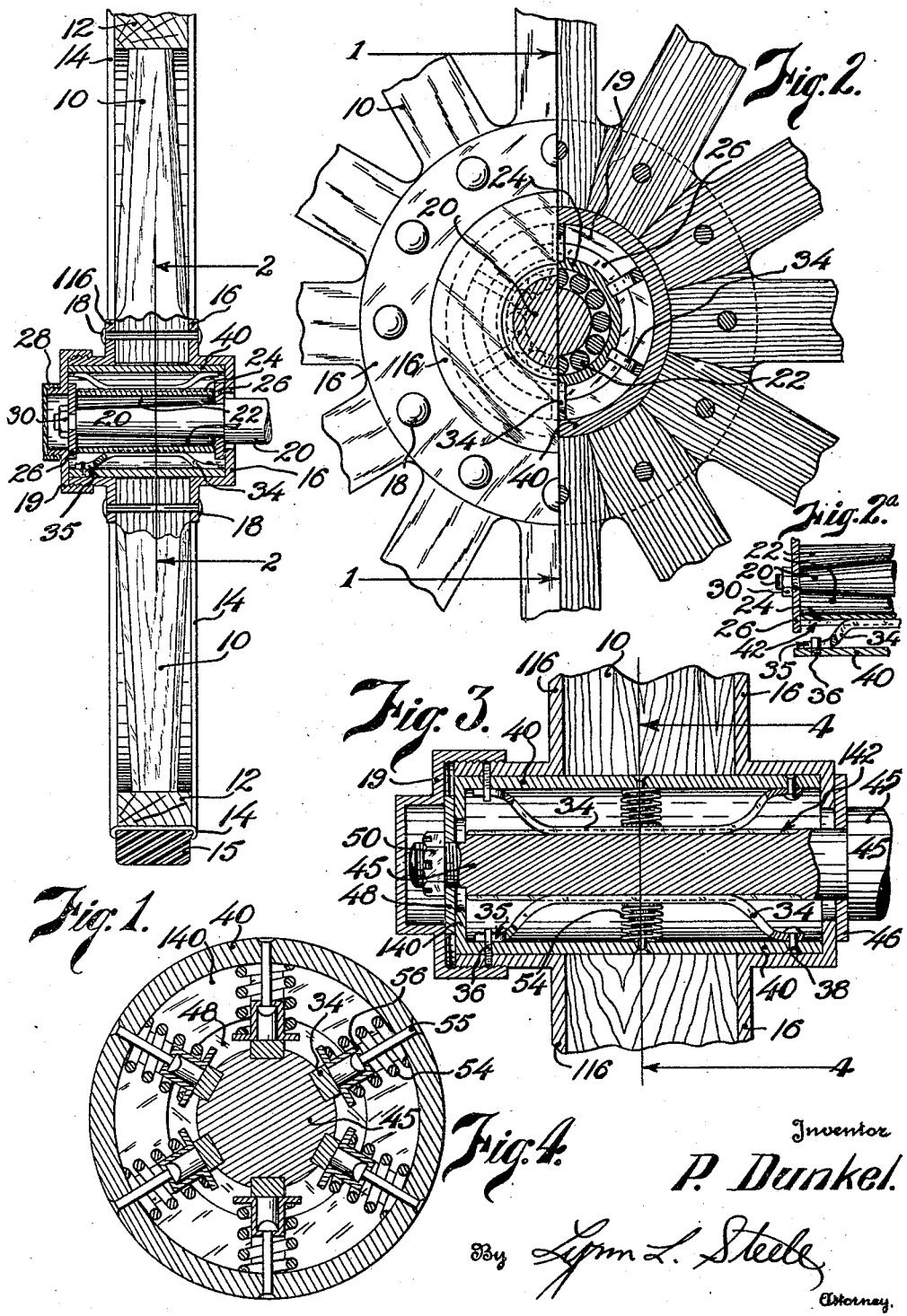

Patented Nov. 20, 1923.

1,474,465

UNITED STATES PATENT OFFICE.

PHILLIP DUNKEL, OF DENVER, COLORADO.

RESILIENT VEHICLE WHEEL.

Application filed July 25, 1922. Serial No. 577,325.

*To all whom it may concern:*

Be it known that I, PHILLIP DUNKEL, a citizen of the United States, and resident of the city and county of Denver, State of Colorado, have invented certain new and useful Improvements in Resilient Vehicle Wheels; and I do declare the following to be a full, clear, and exact description of the invention, such as will enable others skilled in the art to which it appertains to make and use the same, reference being had to the accompanying drawings, which form a part of this specification.

The object of this invention is to provide a resilient wheel which shall be novel, comparatively cheap, efficient and shall eliminate the necessity for pneumatic tires.

The invention resides in a wheel whose usual hub is omitted and a housing or boxing substituted therefor. Into this housing the end of the axle projects and between the axle and the housing yielding means is provided for cushioning the load. In the case of a drive wheel, driving connection may be had between the axle and the housing through the medium of the resilient means, and in the case of an idle wheel bearings may be provided between the axle and a retainer and the yielding means disposed between the retainer and the housing.

In the accompanying drawings, wherein certain embodiments of the invention are disclosed by way of illustration, Fig. 1 is a vertical section through a front or idle wheel showing the mounting of the yielding means;

Fig. 2 is a view partially in section and partially in side elevation as indicated generally by line 2—2 of Fig. 1;

Fig. 2ᵃ is a vertical section detailing a fragment of the showing of Fig. 1;

Fig. 3 is a vertical section showing the mounting in a drive wheel;

Fig. 4 is a cross section on the line 4—4 of Fig. 3.

In the drawings there are shown the spokes 10, felly 12, rim 14 and hard rubber tire 15 of a known type of wheel. At the center of the wheel hub plates or center caps 16 and 116 are secured to the spokes as by bolts or rivets 18, and these plates are apertured centrally to receive the axle and permit limited movement thereof radially. In Figs. 1, 2 and 2ᵃ a front axle 20 for an idle wheel is shown, and this axle 20 works upon roller bearings 22 held in a retainer 24, thrust plates or washers 26 being provided for slidably engaging the inner walls of the hub plates 16 and 116. A hub cap 28 on plate 116 covers a nut 30 on axle 20 for retaining the rollers 22, retainer 24 and washers 26 in assembled relation. A plurality of comparatively broad, stiff leaf springs 34 are notched or slotted at 35 on at least one end for working about guide pins 36 carried by a cylindrical boxing or housing 40 which is held within the hub plates 16 and 116 and between the outer wall of the plate 16 and the cap member 19 threaded onto plate 116. Thus the ends of the springs 34 bear on the inner walls of boxing 40, while the middle portions thereof which are inwardly bowed ride in grooves 42 in the outer walls of retainer 24.

In this form the axle 20 with the rollers 22 and retainer 24 may work radially within the boxing 40 against the tension of springs 34 and thereby cushion the load, the thrust washers 26 riding upon the inner walls of plate 16 and the removable portion 19 of plate 116 and thereby preventing longitudinal movement.

In the case of the drive wheel shown in Figs. 3 and 4, the middle or bowed portions of the springs 34 ride directly in grooves 142 provided in the walls of the drive axle 45, one end of each spring 34 being shown as riveted at 38 to the boxing 40 and the other end slidable about pin 36 for elongation of the spring as in the other form. In this form one thrust washer 46 is shown as engaging the outer wall of plate 16, while the other thrust washer 48 is shown in engagement with the outer wall of an integral flange 140 on the boxing or housing 40, the position of these parts being retained by nut 50. Here the hub cap is integral with the removal portion 19 of the plate 116, and the washer 48 works between the flange 140 and cap 19. For purposes of reinforcement stiff coil springs 54 are disposed between the middle portions of the leaf springs 34 and the inner walls of the housing 40 and these coil springs 54 are retained by means of guiding seats 56 which rest upon the springs 34, and guiding pins 55 secured in the boxing or housing 40, the inner ends of said pins 55 working in the cavity within the respective seats 56.

In the operation of this latter form, the axle moves radially within the housing 40 against the springs 34 and 54 for cushioning the movements of the load and the washers 46 and 48 prevent longitudinal movement. The friction of the parts and the springs 34 through their own rigidity serve amply to impart power from the drive shaft or axle 45 to the housing 40 and connected parts for driving the wheel while at the same time cushioning shocks due to uneven road surfaces and the like.

I claim:

1. In combination, a wheel having a housing at the inner ends of the spokes thereof, an axle projecting into said housing, and leaf springs disposed longitudinally of the axle and positioned between the axle and said housing and directly engaging the axle.

2. In combination, a wheel having a housing at the inner ends of the spokes thereof and passing through the wheel, an axle projecting into said housing, and leaf springs disposed between the housing and the axle whose ends are connected with the housing and whose middle portions are disposed in grooves carried by the axle.

3. In combination, a wheel having a housing passing therethrough at the inner ends of its spokes, an axle projecting into said housing, leaf springs disposed between the housing and the axle longitudinally of the axle, coil springs also between the housing and the axle and positioned intermediate the ends of the leaf springs, means to prevent longitudinal movement of the axle in the housing, the axle being movable radially of the housing against the tension of the springs.

4. In combination, a wheel having a housing at the inner ends of the spokes thereof, an axle projecting into said housing and carrying grooves, and leaf springs seated in said grooves and disposed between the axle and the housing.

In testimony whereof I affix my signature.

PHILLIP DUNKEL.